United States Patent
Coutand et al.

(10) Patent No.: US 11,301,799 B1
(45) Date of Patent: Apr. 12, 2022

(54) TRACKING PHYSICAL DELIVERY OF PRODUCTS THROUGH A FULFILLMENT SYSTEM

(71) Applicant: Aeris Communications, Inc., Santa Clara, CA (US)

(72) Inventors: Olivier G. Coutand, San Jose, CA (US); Subramanian Balakrishnan, Cupertino, CA (US); Narendra Kumar Sharma, Sunnyvale, CA (US); Ivan L. Stanchev, Palo Alto, CA (US); Drew S. Johnson, San Jose, CA (US); Deborah Robbins Schwarzer, Los Altos, CA (US)

(73) Assignee: Aeris Communications, Inc., San Jose, CA (US)

( * ) Notice: Subject to any disclaimer, the term of this patent is extended or adjusted under 35 U.S.C. 154(b) by 770 days.

(21) Appl. No.: 14/879,022

(22) Filed: Oct. 8, 2015

Related U.S. Application Data (60) Provisional application No. 62/062,071, filed on Oct. 9, 2014.

(51) Int. Cl.
    *G06Q 10/08* (2012.01)
(52) U.S. Cl.
    CPC ............... *G06Q 10/0833* (2013.01)
(58) Field of Classification Search
    CPC .................................................. G06Q 10/0833
    USPC ........................................................ 705/333
    See application file for complete search history.

(56) References Cited

U.S. PATENT DOCUMENTS

| | | | |
|---|---|---|---|
| 5,956,636 | A | 9/1999 | Lipsit |
| 6,996,538 | B2 | 2/2006 | Lucas |
| 7,044,380 | B2 | 5/2006 | Knehr-Mclaren et al. |
| 7,333,955 | B2 | 2/2008 | Graves et al. |
| 8,032,181 | B2 | 10/2011 | Hauck et al. |
| 8,245,927 | B2 * | 8/2012 | Grant ............... G06Q 30/018 235/375 |
| 8,407,110 | B1 | 3/2013 | Joseph et al. |
| 8,676,745 | B2 * | 3/2014 | Papili ............... G06Q 10/087 707/601 |

(Continued)

FOREIGN PATENT DOCUMENTS

WO      WO-9963744 A1 * 12/1999  ........... H04Q 3/0029

OTHER PUBLICATIONS

"Networked RFID for use in the Food Chain" Published by Hitachi Europe Ltd. (Year: 2006).*

(Continued)

*Primary Examiner* — Zeina Elchanti
(74) *Attorney, Agent, or Firm* — Brundidge & Stanger, P.C.

(57) ABSTRACT

A computer-implemented method and system for tracking physical delivery of a batch of products through a third party system and registration of the batch of products with a seller using a non-recurring secure identifier for the batch of products are provided. The computer-implemented method and system allow for generating a non-recurring secure identifier for a batch of products containing one or more products; assigning the non-recurring secure identifier to the batch of products; and using the non-recurring secure identifier for associating the batch of products with an account of a recipient, wherein the batch of products are enabled to receive services associated with the account.

33 Claims, 7 Drawing Sheets

| ID type | Assigned by and Reason | Packaging Level | Used by | | |
|---|---|---|---|---|---|
| | | | Network Operator | Fulfillment Company | Customer |
| ICCID (unique) (Integrated Circuit Card Identifier) 202 | SIM manufacturer (to identify specific SIMs) | Imprinted on individual SIM | Provisioning on Network Operator network | Not visible | Provisioning on Network Operator Network |
| ASN (not unique) (Fulfillment Company Standard ID Number) 204 | Fulfillment Company (to identify SKU by seller and type of product) | Outside Network Operator package to facilitate pick, pack, ship | Visible but not relevant | Index product in Fulfillment Company catalog and warehouse | Visible but not relevant |
| Network Operator Package Code (non-recurring and secure) 206 | Network Operator (to identify exact SIMs in package) | Inside Network Operator package | Associate ICCIDs of SIMs to Network Operator package and later with customer account | Not visible | Enter in Network Operator system to associate SIMs received with account |
| Tracking number (unique) 208 | Shipment carrier (UPS, FedEx) (to track shipments) | Outside boxes carried by shipment carrier | Tracking number for shipment | Tracking number for shipment | Tracking number for shipment |

(56) References Cited

U.S. PATENT DOCUMENTS

| | | | |
|---|---|---|---|
| 8,695,058 B2 | 4/2014 | Batchu et al. | |
| 8,903,365 B2 | 12/2014 | Stricklen et al. | |
| 2003/0180138 A1 | 9/2003 | Scheltes et al. | |
| 2004/0174259 A1* | 9/2004 | Peel | G07C 5/008 340/539.26 |
| 2004/0233055 A1* | 11/2004 | Canich | G06Q 10/08 340/539.26 |
| 2005/0037752 A1* | 2/2005 | Kwan | H04W 8/18 455/432.3 |
| 2006/0192652 A1* | 8/2006 | Mandava | G06K 7/0008 340/5.8 |
| 2007/0055883 A1* | 3/2007 | Kruse | G06K 19/10 713/176 |
| 2007/0179978 A1* | 8/2007 | Lee | G06Q 30/06 |
| 2007/0187266 A1 | 8/2007 | Porter et al. | |
| 2008/0162584 A1* | 7/2008 | Papili | H04W 8/26 |
| 2010/0027469 A1* | 2/2010 | Gurajala | G06Q 30/016 370/328 |
| 2013/0173641 A1* | 7/2013 | Roediger | G06F 16/245 707/756 |
| 2013/0238471 A1 | 9/2013 | Maraz et al. | |
| 2013/0341403 A1* | 12/2013 | Uebe | G06K 7/10544 235/462.41 |
| 2014/0141764 A1 | 5/2014 | Papili et al. | |

OTHER PUBLICATIONS

"GSMA IMEI Database Technical Projects", last accessed on May 26, 2015 at http://www.gsma.com/technicalprojects/fraud-security/imei-database.

* cited by examiner

- SIMs 102 are the individual units
  - Standard mini-SIM (2FF), M2M grade mini-SIM (2FF), each imprinted with an identifying number specific to that SIM

- Individual units of SIMs packed in Network Operator packages 104
  - Packages of 10 or 100 SIMs
  - Customer orders SIMs in multiples of 10s or 100s

- Network Operator packages are packed in Fulfillment Company boxes 106
  - Each Fulfillment Company box contains Network Operator packages containing the total number of SIMs ordered by customer

FIG.1

| ID type | Assigned by and Reason | Packaging Level | Network Operator | Fulfillment Company | Customer |
|---|---|---|---|---|---|
| ICCID (unique) (Integrated Circuit Card Identifier) 202 | SIM manufacturer (to identify specific SIMs) | Imprinted on individual SIM | Provisioning on Network Operator network | Not visible | Provisioning on Network Operator Network |
| ASN (not unique) (Fulfillment Company Standard ID Number) 204 | Fulfillment Company (to identify SKU by seller and type of product) | Outside Network Operator package to facilitate pick, pack, ship | Visible but not relevant | Index product in Fulfillment Company catalog and warehouse | Visible but not relevant |
| Network Operator Package Code (non-recurring and secure) 206 | Network Operator (to identify exact SIMs in package) | Inside Network Operator package | Associate ICCIDs of SIMs to Network Operator package and later with customer account | Not visible | Enter in Network Operator system to associate SIMs received with account |
| Tracking number (unique) 208 | Shipment carrier (UPS, FedEx) (to track shipments) | Outside boxes carried by shipment carrier | Tracking number for shipment | Tracking number for shipment | Tracking number for shipment |

TRACKING PHYSICAL DELIVERY OF PRODUCTS THROUGH A FULFILLMENT SYSTEM

CROSS-REFERENCE TO RELATED APPLICATIONS

Under 35 USC 119(e), this application claims priority to U.S. provisional application Ser. No. 62/062,071, filed on Oct. 9, 2014.

FIELD OF THE INVENTION

The present invention relates generally to physical delivery of products through a third party system and registration of those products with a service provider, and more particularly to a process for connecting the physically-delivered products to wireless services.

BACKGROUND

Products that are intended to connect or enable other products to connect to networks such as wireless or cellular networks ordinarily must be associated with a user's account and subscription with the network operator and authorized by the network operator to connect to the network before any services can be provided to the product.

These products may, however, be issued or sold through a third party that is not able to associate the numbers for the products issued or purchased with the buyer's account in the network operator's records, in which event the products would not be registered on the network operator's system or authorized to receive services until the user took additional steps to register the numbers for such products on the network operator's system and associate them with the user's account. For buyers buying a small number of products, such a requirement is not overly burdensome, but for enterprise buyers, such as those purchasing large quantities of Subscriber Identity Modules (SIMs) for deployment in a large number of devices, manual entry of numbers would impose a considerable burden.

Accordingly, what are needed are systems and methods to address the above identified issues. The present invention addresses such a need.

SUMMARY

A computer-implemented method and system for tracking physical delivery of a batch of products through a third party system and registration of the batch of products with a seller using a non-recurring secure identifier for the batch of products are provided. The computer-implemented method and system allow for generating a non-recurring secure identifier for a batch of products; assigning the non-recurring secure identifier to the batch of products; and using the non-recurring secure identifier for associating the batch of products with an account of a recipient, wherein the batch of products are enabled to receive services associated with the account.

DETAILED DESCRIPTION

The present invention relates generally to delivery and registration of products and more particularly to a process for connecting the physically-delivered products to wireless services.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Devices, whether phones, radios or other types of hardware, that are intended to connect or, in the case of Subscriber Identification Modules (SIMs), enable other devices to connect to networks, such as wireless or cellular networks, ordinarily must be associated with a user's account and subscription with the network operator and authorized by the network operator to connect to the network before any services can be provided to the product or SIM, typically through registration of one or more identifiers for the product or SIM, such as an Integrated Circuit Card Identifier (ICCID), International Mobile Subscriber Identity (IMSI), or other distinct number, referred to collectively herein for convenience as a "number", with the network operator. If the product or SIM (referred to collectively for convenience as a "product") is acquired by the user directly from the network operator, the network operator can, either during a store check-out process or as part of shipping the products to the user, register the numbers for the acquired products on the network operator's system and associate them with the user's account and subscription so that the products are already authorized to connect to the network and receive services upon receipt by the user.

Products may, however, be issued or sold through a third party that is not able to associate the numbers for the products issued or purchased with the buyer's account in the network operator's records, in which event the products would not be registered on the network operator's system or authorized to receive services until the user took additional steps to register the numbers for such products on the network operator's system and associate them with the user's account. For buyers buying a small number of products, such a requirement is not overly burdensome, but for enterprise buyers, such as those purchasing large quantities of SIMs for deployment in a large number of devices, manual entry of numbers would impose a considerable burden.

One such third party in a supply chain is an order fulfillment service that, for a fee, stores packages containing the products for a seller, such as a network operator, in its own facility and then picks, packs and ships products to a buyer on notification from the seller of an order. While it is possible that such a fulfillment service could send a report to the network operator that notifies the network operator of the numbers for the products contained in a shipment to an identified buyer, such a service would be time-consuming, error-prone and expensive and would eliminate any increased efficiency in using a third party fulfillment service. Many such fulfillment services, moreover, do not permit any markings on the exterior of packages other than information about the content in the package (for example, "10 2FF SIM cards") and an optical machine-readable description, such as a Universal Product Code (UPC) bar code, that is identical to all packages with the same content, and will not open a package during the fulfillment process in order to record the numbers of any products in that package.

If such a fulfillment service sends a package without notifying the network operator of the numbers for the products in the package, then the products will not be associated with the buyer's account and authorized to operate on the network when received by the buyer until the buyer "registers" the products by notifying the network operator of the numbers for the products received. Many commonly-used types of numbers are long and complex, and requiring the buyer to enter the numbers manually into its account on the network operator's account system would be both burdensome and error-prone, especially if large quantities of products were acquired, and would frustrate the seller's or network operator's interest in ensuring that the products provided to a buyer are easily and correctly associated with an appropriate account and that the services for which that account holder has subscribed are available without undue burden.

Accordingly, what are needed are systems and methods to address the above identified issues. The present invention addresses such a need.

Although a system and method in accordance with the invention is described with respect to product such as a SIM, as used herein the term "product" is intended to be inclusive, interchangeable, and/or synonymous with appliances, electronic modules, telephony equipment, devices and other similar products that require registration of distinct identifying numbers. These distinct identifying numbers may include ICCIDs, IMSIs or other serial numbers, as described further below and collectively referred to herein as "numbers", that are utilized for that product to receive services with a service provider. Many such products are small (such as SIMs) and can be processed and shipped in a batch as a single package, which presents the challenge of managing the complex numbers associated with a large batch of products. One of ordinary skill in the art will readily recognize that functionally different types of products may have characteristics, functions and/or operations which may be specific to their individual capabilities and/or deployment and still be within the spirit and scope of the present invention.

A SIM is an integrated circuit that securely stores certain numbers and other information that allow the device in which the SIM in installed to receive services on the network operator's system in accordance with the subscription between the SIM owner and the network operator. Each SIM is imprinted by the manufacturer with a distinct number of at least 18 digits used to identify that specific SIM called an Integrated Circuit Card Identifier (ICCID). SIMs also include other information, such as keys used to identify and authenticate subscribers (such as mobile phones and computers) on cellular networks, security authentication and ciphering information, temporary information related to the local network, a list of the services the user has access to, and the like. Network operators can sell SIMs to their customers directly. Orders for products such as SIMs sold by a seller such as a network operator can also be processed and shipped through a third-party company where the third party company stores sealed packages of products for the seller in its own facility and then, in response to an order communicated to it by the seller, picks, packs and ships packages of products to a buyer, and if needed provides customer service for these orders.

Users who wish to receive services from network operators must have an account with the network operator and a subscription defining the services available to the user. The user must also have specific devices or products, such as SIMs, that are enabled for operation on the network, meaning that the numbers of each device of the customer, including any SIMs, are registered with the network operator's system and associated with the correct account and subscription of the user. This is necessary so that the devices on which the SIMs are installed receive the appropriate services. If the network operator sells SIMs to a customer and ships them directly to the customer, the network operator can, during the order fulfillment process, register the numbers of the SIMs shipped to the customer in its system and associate them with the customer's account.

Where, however, the network operator uses a third party company or fulfillment service to deliver SIMs to buyers, the network operator typically will not know which SIMs are contained in a shipment to a particular customer. In such a case, the network operator will not be able to provide, and the customer will not be able to receive, the appropriate services for those SIMs until the customer registers the numbers for the received SIMs with the network operator, possibly by entering the numbers into its account at the network operator's website. The process of entering the numbers can be burdensome and the possibility of error increases as the length of the number and the quantities of SIMs received increases, which is likely in the case of enterprise customers purchasing tens if not hundreds of SIMs at a time. There is also a possibility of fraud if the shipment is mis-delivered and the recipient of the shipment attempts to register and use the products.

To overcome the above-identified possibility of fraud and the tedious process of entering many, if not hundreds, of long ICCIDs or other distinct numbers to register and identify the SIMs received and to activate the appropriate services associated with the customer's account, and/or that particular batch of products, a system and method in accordance with an embodiment is provided.

A computer-implemented method and system for tracking physical delivery of a batch of products through a third party fulfillment system and registration of the batch of products with a seller using a non-recurring secure identifier for the batch of products is provided. The computer-implemented method and system allow for generating and assigning a non-recurring secure identifier to a batch of products (each of which is identified by another distinct number) that has been grouped together as a package for sale. When the third party company ships a package to a customer, the customer receives this non-recurring secure identifier in the package and provides it to the network operator, which verifies the identity and authority of the person attempting to register the products and, upon verification, automatically identifies which specific products (such as SIMs) were received by that customer. The system and method allow the network operator to associate the products (such as SIMs) quickly as a batch (rather than singly) with that customer's account.

Thus, the non-recurring secure identifier is used by the buyer to register, or associate, the products received with the buyer's account and subscriptions with a seller without manually entering the individual identifying numbers for all of the products received, thereby in one simple step enabling the seller to provide, and such products to receive, the appropriate services associated with the buyer's account or that particular batch of products.

To describe the features of the present invention in more detail within the context of products such as SIMs, refer to the accompanying figures in conjunction with the following discussions. These examples are used for purpose of illustration only, and should not be construed as limitations.

Figure 1:
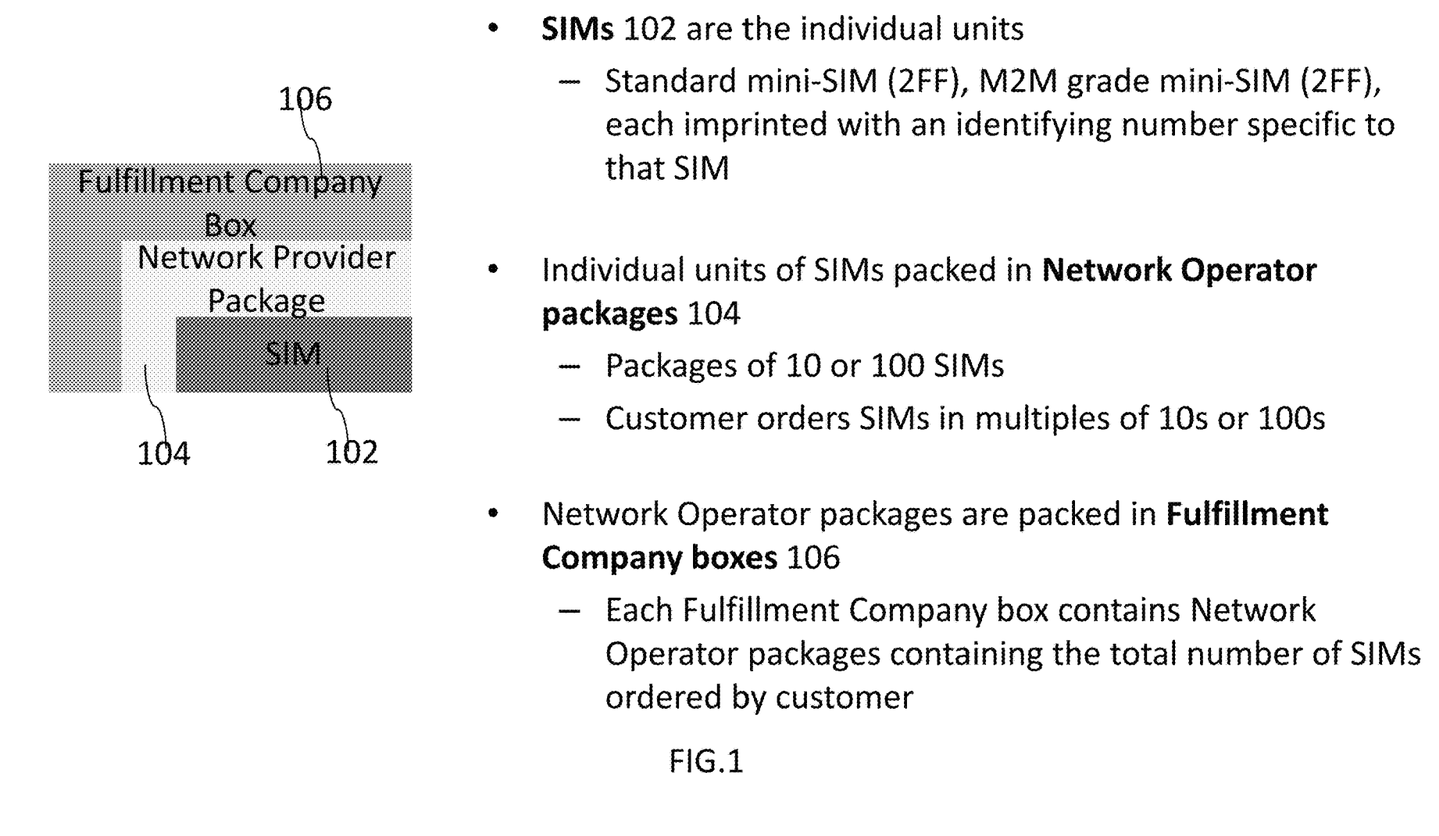
FIG. 1 illustrates an overview for packaging products so as to assist with tracking the physical delivery of a batch of products and with identifying and registering that batch of products in accordance with an embodiment.

FIG. 1 illustrates an overview for packaging products in a manner that will assist with tracking physical delivery of a batch of products shipped through a third party company and with identifying and registering that batch of products with a service provider in accordance with an embodiment. SIMs 102 are the individual units, for example, Standard mini-SIM (2FF), M2M grade mini-SIM (2FF), each imprinted with an identifying number specific to that SIM. Individual units of SIMs packed in Network Operator packages 104 which can be packages of 10 or 100 SIMs and the customer may order SIMs in multiples of 10s or 100s or multiple of any other number set by the network provider. Network Operator packages are then packed in Fulfillment Company boxes 106. Each Fulfillment Company box contains Network Operator packages containing the total number of SIMs ordered by customer.

Figure 2:
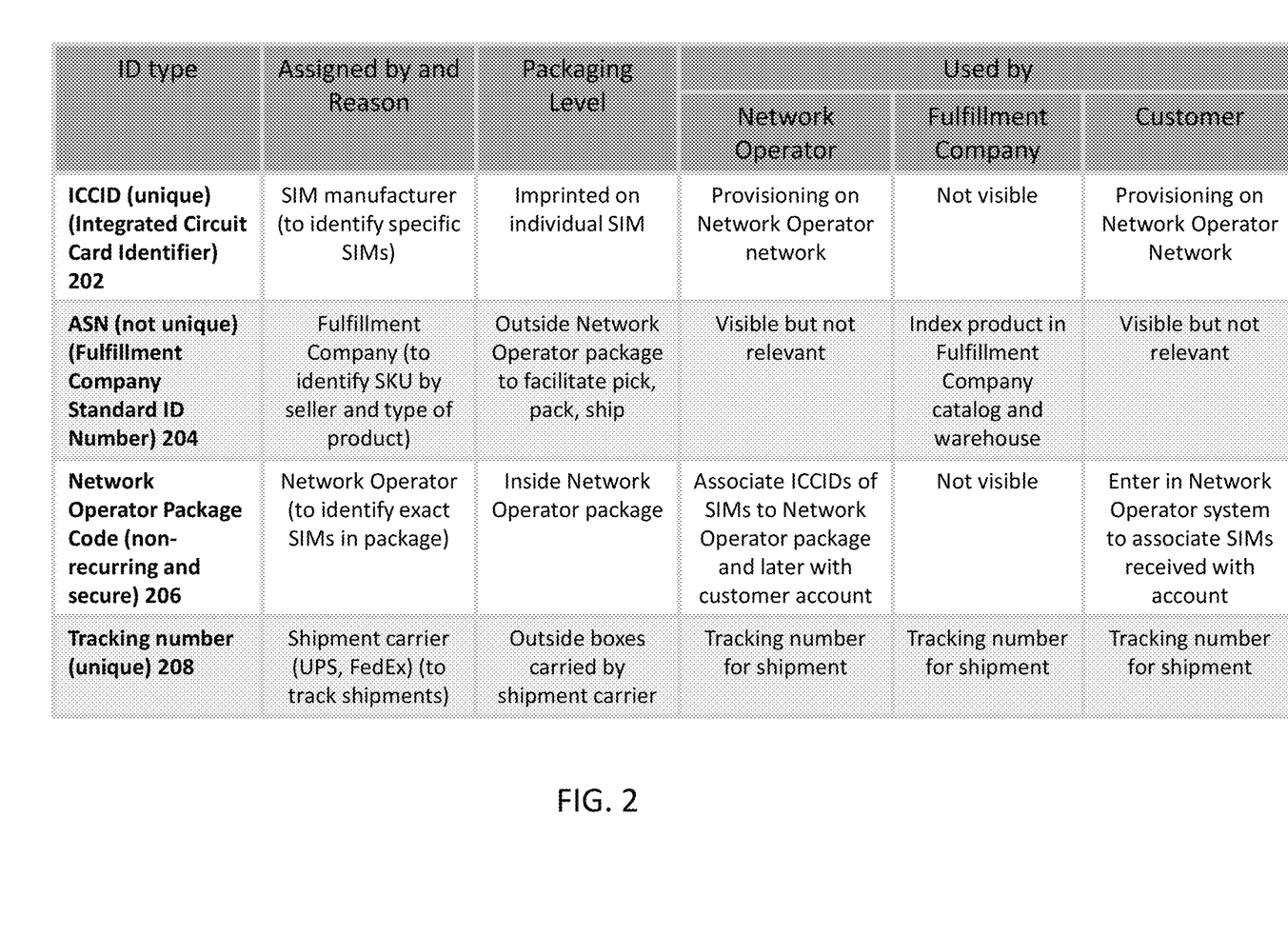
FIG. 2 illustrates different types of identifiers and their purpose as related to tracking of physical delivery and subsequent registration of a batch of products in accordance with an embodiment.

FIG. 2 illustrates different types of identifiers and their purpose as related to tracking of physical delivery of a batch of products shipped through a third party company and registration of those products with a service provider in accordance with an embodiment. Different types of identifiers are used for different purposes, such as manufacturing, packaging and shipment of SIMs, and associating the ICC-IDs of SIMs to a package by different entities, such as manufacturers, network operators, third party companies (fulfillment services), shipment carriers and customers involved in the process as shown. For example, ICCID 202, which is a unique Integrated Circuit Card Identifier, is assigned by a SIM manufacturer to identify specific SIMs and is imprinted on the individual SIM. ICCID 202, which is not visible to the fulfillment company, is used by the network operator and customer for provisioning devices containing that SIM on the network operator's network so that the devices can receive network services. Advanced shipping notice (ASN) 204 is a standard identification number assigned by the fulfillment company to identify a stock keeping unit (SKU) by seller and type of product. The ASN 204 is placed on the outside of the network operator's package to facilitate picking, packing and shipping of the products and for indexing products in the fulfillment company's catalog and warehouse. ASN 204 may or may not be visible to, but may not be relevant to, the network operator and customer. A non-recurring secure network operator package code 206 is assigned by network operator to identify the exact SIMs in the package and is placed inside the network operator package by the network operator prior to shipment to the fulfillment company. The non-recurring secure network operator package code 206 is used after receipt of the package by the customer to associate ICCIDs of SIMs with the customer account by both the network operator and the customer. A unique tracking number 208 is assigned by shipment carrier such as UPS, FedEx etc., is placed on the outside of the shipment boxes, and is used as a tracking number for the shipment by all the entities involved.

Figure 3:
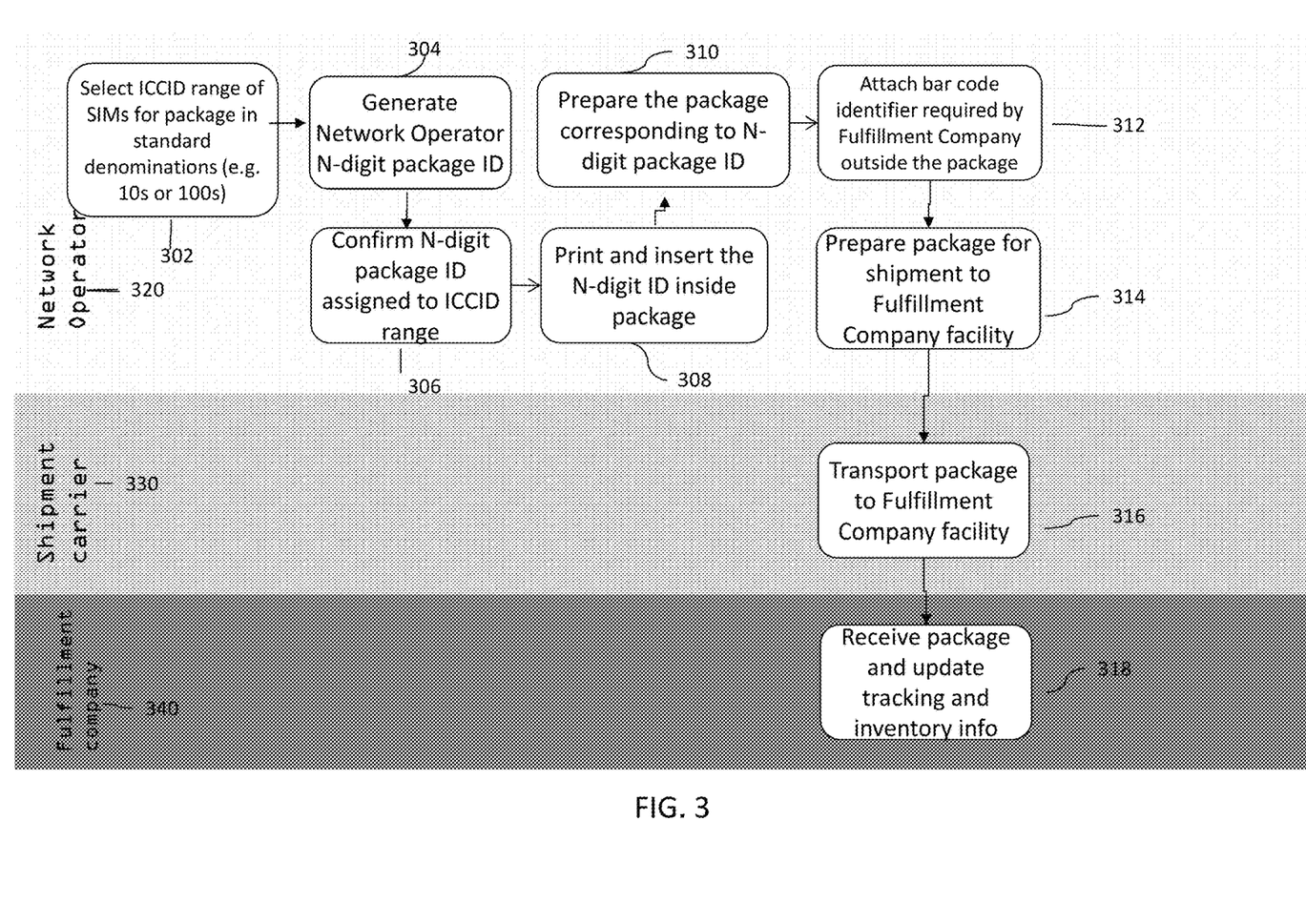
FIG. 3 is a diagram illustrating a packaging process that enables tracking of physical delivery and subsequent registration of a batch of products in accordance with an embodiment.

FIG. 3 is a diagram providing an overview of a packaging process that enables tracking of physical delivery of a batch of products through a third party company and registration of those products with a service provider in accordance with an embodiment. As shown in FIG. 3, the packaging process involves several steps. In step 302, the network operator 320 selects an ICCID range of a batch of products in designated quantities (such as for example tens or hundreds) to be included in a single package. In step 304, an N-digit identifier is generated by the network operator 320 and assigned to that package and its contents. The identifier, which can be made non-recurring and secure either by putting a unique constraint within the table or by handling it at code level, is compared to identifiers already used; if the secure identifier appears to be the same as one that has already been used, the secure identifier is thrown out and a replacement non-recurring secure identifier is generated.

In an embodiment, a non-recurring secure identifier in alphanumeric format is at least two digits, for example, N digits in length, one or more digits of which is generated by an algorithm used for secure validation, for example, a Luhn algorithm, and the remainder of which are generated using a random number generation process. For example, in an embodiment, the non-recurring secure identifier comprises at least six digits, wherein at least five of the at least six digits are alphanumeric and generated randomly, and the sixth digit is generated by using a Luhn algorithm for secure validation.

Although the embodiment to create a non-recurring secure identifier is described using at least two as a number of digits and using a Luhn algorithm, one of ordinary skill in the art readily recognizes that the non-recurring secure identifier can be made of any number of digits, for example N-digits and using any suitable validation algorithm, for example, Verhoeff algorithm or Damm algorithm that would be within the spirit and scope of the present invention.

The network operator 320 confirms that the N-digit non-recurring secure identifier is assigned to the expected ICCID range via step 306, then prints and inserts the N-digit non-recurring secure identifier inside the package via step 308. The network operator 320 prepares the package for handling by the third party company (fulfillment service) via step 310 by attaching an identification number (such as an ASN, or barcode number) assigned by the third party company for purposes of identification of a stock keeping unit (SKU) of that type of network operator product (e.g., package of 10 2FF SIMs) in the third party company warehouse on the outside of the package via step 312. The network operator 320 prepares the box for shipment to the third party company 340 via step 314. The package is then transported to the third party company 340 by a shipment carrier 330 (e.g., USPS, UPS or FedEx) via step 316 using a unique tracking number for that package assigned by the shipment carrier 330 for purposes of identifying the package, shipper and recipient. The third party company 340 receives the package and updates its inventory records of network operator packages available for fulfillment of customer orders via step 318.

Figure 4:
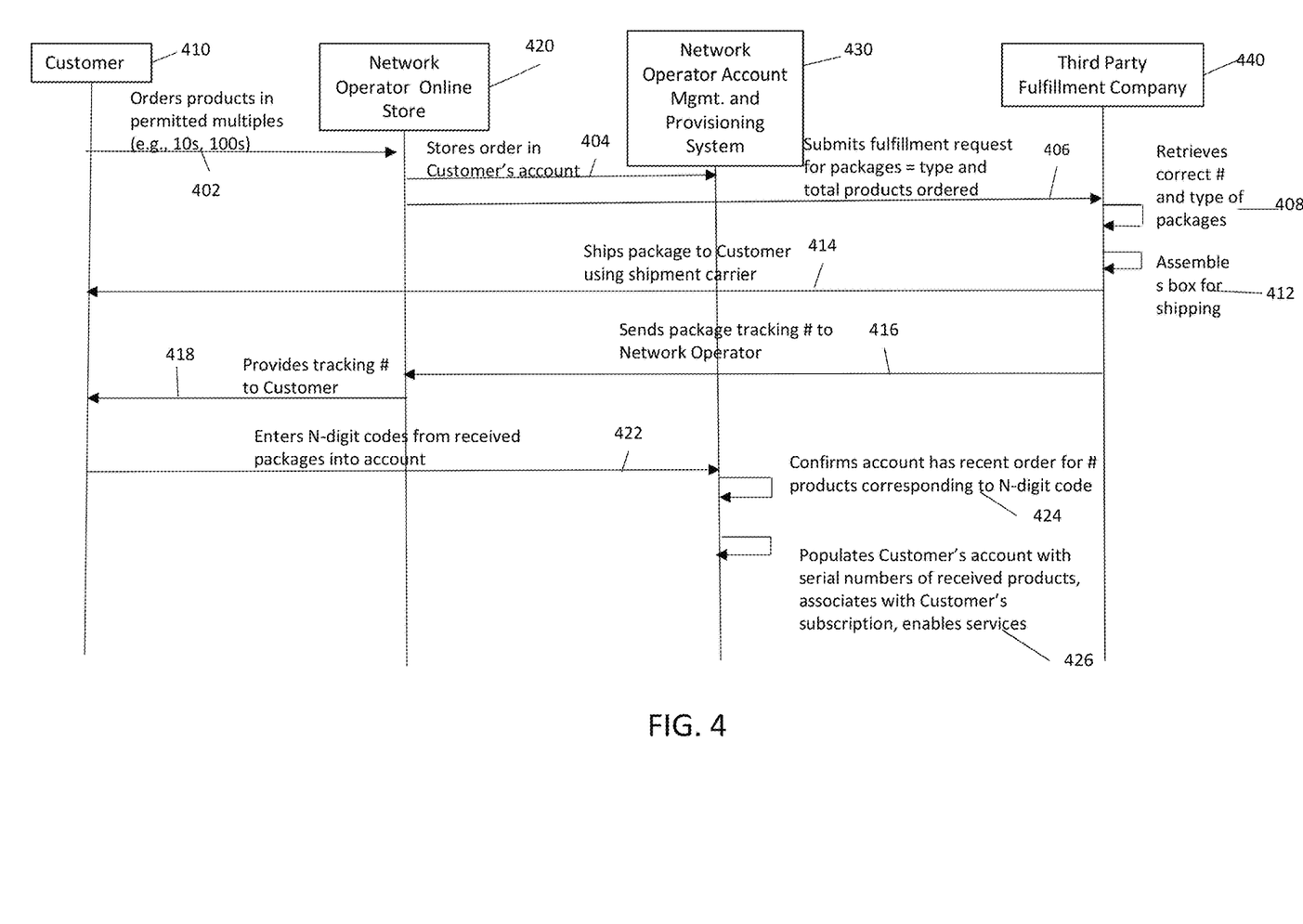
FIG. 4 is a diagram illustrating a customer order process that enables tracking of physical delivery and subsequent registration of a batch of products in accordance with an embodiment.

FIG. 4 is a flow chart illustrating a customer order process that enables tracking of delivery and registration of a batch of products in accordance with an embodiment. In an embodiment, a customer 410 visits a network operator store website 420 and places an order for "x" number of SIMs in permitted multiples (e.g., 10s or 100s) corresponding to the denominations of package size stored with the third party company via step 402. A person of ordinary skill in the art will recognize that any other denomination for the number of products ordered can be used to correspond to the denominations used for packaging.

The network operator 420 stores the order in the customer's account in the network operator account management and provisioning system 430 via step 404 and then sends a request for fulfillment of the order to the third party company 440 via step 406. The fulfillment company 440 receives the fulfillment request, retrieves from the warehouse one or more network operator packages received and stored by the third party company 440 containing, in the aggregate, the number of SIMs ordered by the customer 410 via step 408, and places the network operator package(s) in a box for shipping via step 412.

The third party company 440 gives the box to a shipment carrier to be transported to the customer 410 via step 414. The third party company 440 provides the network operator 420 a box tracking number assigned by the shipment carrier, which identifies the shipment carrier, the shipper, the recipient and the box (but not the N-digit non-recurring secure identifier(s) assigned to any network operator packages by the network operator 420) via step 416. The network operator provides the same box tracking number to the customer 410 via step 418. When the customer 410 receives the box containing the network operator package(s), the customer 410 retrieves the non-recurring secure N-digit identifier from each network operator package contained in the box. The customer 410 is prompted by instructions included with the non-recurring secure identifier to sign in to its account with the network operator 420, navigate to the appropriate page of the network operator's customer account management website 430 and enter the non-recurring secure identifier for each network operator package via step 422. The entry of the non-recurring secure identifier triggers a call to the network operator provisioning database 430 for the ICCID or other numbers of all of the SIMs associated with that non-recurring secure identifier and contained in that package, allowing for rapid and secure association of the SIMs contained in the network operator packages received by the customer 410 with the customer's account.

As a protection against fraud in the case of misdelivery of a package, in an embodiment, the network operator account management system 430 checks to see if there is a pending order associated with that customer's account for the number and type of SIMs relating to that secure identifier; if confirmed, the customer's account will be populated with these ICCIDs or other numbers without further input by the customer 410. Associating the received SIMs with the customer's account further allows the network operator 420 to activate the appropriate services for those SIMs in accordance with the subscription that the customer 410 has with the network provider 420.

If the customer 410 cannot locate or has misplaced the non-recurring secure identifier for a network operator package, the customer can, in an embodiment, activate a system for retrieving the identifier, such as opening a dialog box at the network operator account management website 430, which will ask the customer 410 to enter at least one ICCID of a SIM contained in the network operator package(s) received. The ICCID is utilized to look up the associated non-recurring secure identifier(s) in the network operator provisioning database 430; if further security checks are validated confirming that the customer 410 had ordered SIMs from that account, the network operator account management system 430 can generate an email to the customer 410 with the missing non-recurring secure identifier(s) so that the process of associating all of the SIMs received in that network operator package with the customer's account can be completed.

In an embodiment, additional security measures can be provided before provisioning the SIMs by using validation parameters comprising any of number of digits in SIM package code, UserID, presence of SIM package code in the system, maximum package size allowed, presence of pending order against the account and the SIM type associated with the pending order, number of packages in the order that are not already activated and package size selected for provisioning relative to package size in the order. Additional constraints such as availability of the entire set of SIMs tagged with package code for allocation: partial sets may not be allocated; presence of only one rate plan and service profile for the account if provision is requested and a combination thereof may also be implemented.

In an alternate embodiment, the network operator will receive SKU (stock keeping unit for the product category) and quantity information from the third party company. In other words, the network operator will get an identifier for "The 10-pack" and how many of those were put into the customer order (which should match what the network operator requested via the API). Although this means that the network operator would not be able to assign specific SIMs to the account at the time of the order, the network operator can set the SellerFulfillmentOrderId, for example, a 4-digit number (0-9/A-Z). In addition, each package (i.e. 10-pack, 100-pack) can have a unique package identifier placed on it by the network operator in addition to the SKU, for example, a 5-digit number (0-9/A-Z). When the user receives the packages, in order to provision the SIMs in a particular package, they must provide the Order ID and/or Package ID. Including the Order ID as part of this process will also prevent accidental or malicious activation of packages that do not belong to that customer.

Figure 5:
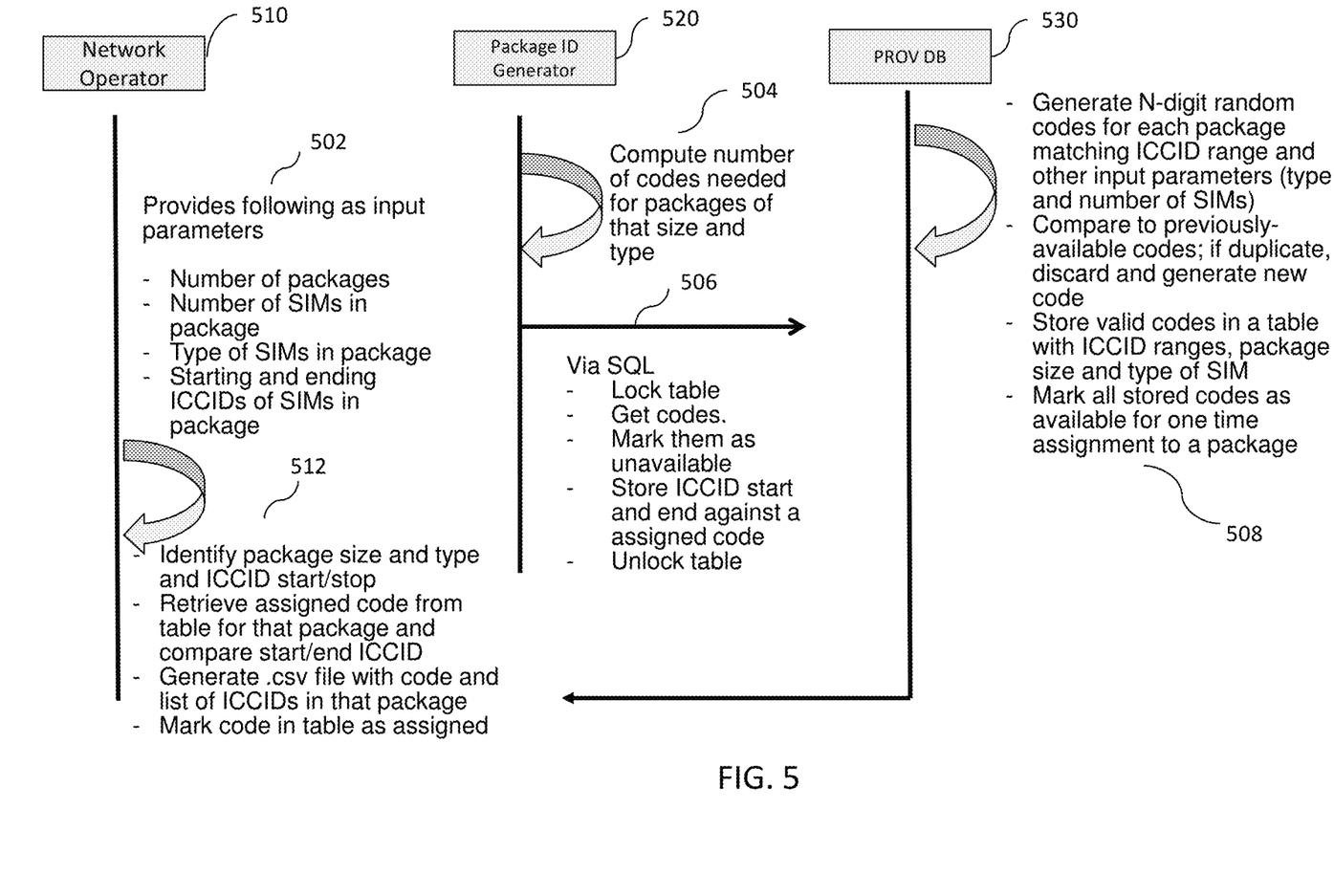
FIG. 5 is a diagram illustrating a process for generating non-recurring secure identifiers for batches of products to enable tracking of physical delivery and subsequent registration of those batches of products in accordance with an embodiment.

FIG. 5 is a diagram illustrating a process for generating non-recurring secure identifiers for batches of products to enable tracking of delivery and registration of those batches of products in accordance with an embodiment. FIG. 5 further illustrates steps 304, 306 and 308 of the process shown in FIG. 3. As shown in FIG. 5, the network operator 510 provides input parameters such as the number of packages for which non-recurring secure identifiers are needed, the type of SIMs in each package (e.g., 2FF), the number of SIMs in each package (e.g., 10 SIMs) and the range of ICCIDs for the SIMs in each package as start ICCID and end ICCID, via step 502 to a package identifier (non-recurring secure identifier) generator 520 to compute the number of non-recurring secure identifiers needed for packages containing that number and type of SIM. The number of identifiers required is calculated via step 504.

The request and associated input parameters are then provided to the provisioning database 530 via step 506 to generate the correct number of N-digit codes as non-recurring secure identifiers for the packages covered by the request. Via step 508, the database 530 generates a non-recurring secure identifier for each package, compares the non-recurring secure identifier with previously-generated non-recurring secure identifiers (if a newly-generated identifier repeats a previously-used identifier, it is discarded and a new one generated), stores the input parameters for the package, including the ICCIDs for the SIMs contained in the package, with the non-recurring secure identifier generated for that package in a table, and marks all generated identifiers as available for one-time assignment to a package. The non-recurring secure identifier (code) generated for a specific package is then retrieved, the start ICCID and end ICCID for that package are confirmed, a .csv file is generated that contains the assigned code and a list of all ICCIDs in that package, and the code is marked as assigned via step 512.

Figure 6:
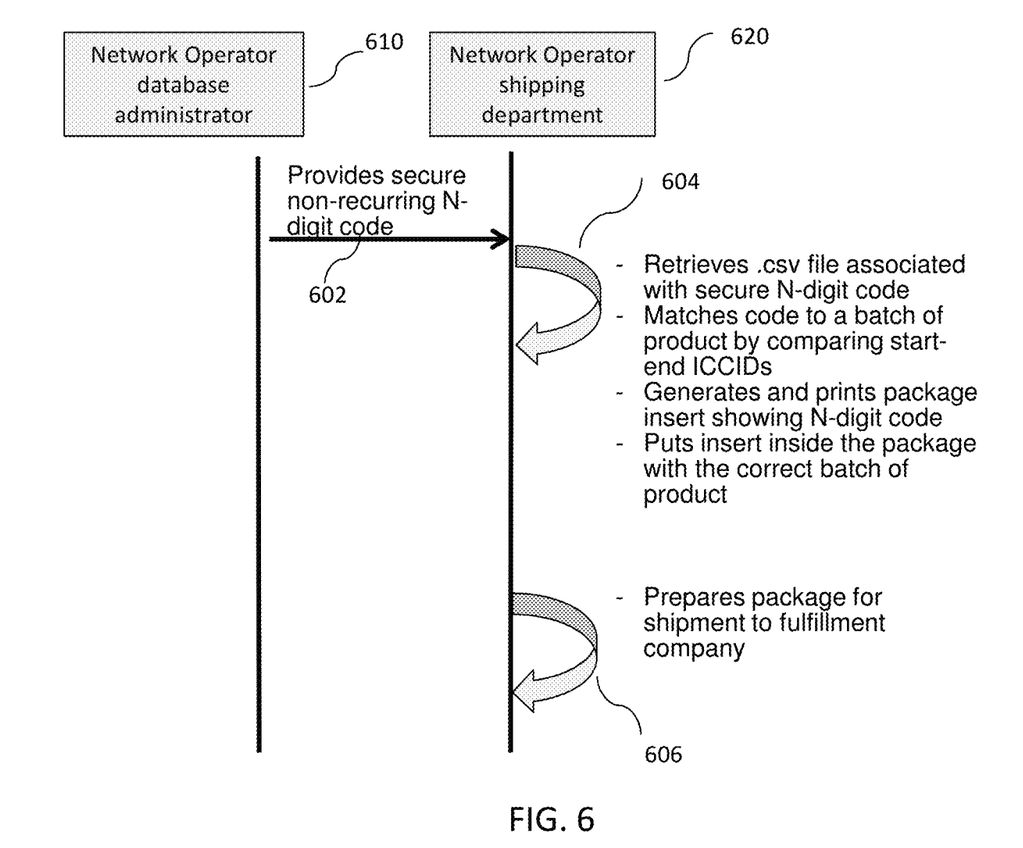
FIG. 6 is a diagram illustrating a process for retrieving and using non-recurring secure identifiers for a batch of products enabling tracking of physical delivery and subsequent registration of that batch of products in accordance with an embodiment.

FIG. 6 is a diagram illustrating a process for retrieving and using non-recurring secure identifiers for a batch of products enabling tracking of delivery and registration of that batch of products in accordance with an embodiment. As shown in FIG. 6, the network operator database administrator 610 provides an N-digit non-recurring secure identifier generated as shown in FIG. 5 to the network operator shipping department 620 for shipping network operator packages to the third party company. In an embodiment, the network operator database administrator 610 provides or makes available to the network operator shipping department 620 a list or table of non-recurring secure identifiers via step 602. The network operator shipping department 620 retrieves the non-recurring secure identifier associated with a batch of SIMs to be shipped as a single package via step 604.

In an embodiment, the network operator shipping department 620 retrieves the non-recurring secure identifier for a batch of SIMs through a query to the database including at least one ICCID of a SIM in that batch of product, retrieves the .csv file associated with the N-digit non-recurring secure identifier, confirms that the non-recurring secure identifier associated with that .csv file is assigned to the given batch of product to be shipped, generates and prints a package insert showing the N-digit non-recurring secure identifier, and puts the printed insert and the correct batch of product inside the package via step 604. The network operator shipping department 620 then prepares the package for shipment to the third party company via step 606 (see steps 312 through 318 of FIG. 3), whereupon the package is stored by the third party company and is available for fulfillment of customer orders as described in FIG. 3.

Figure 7:
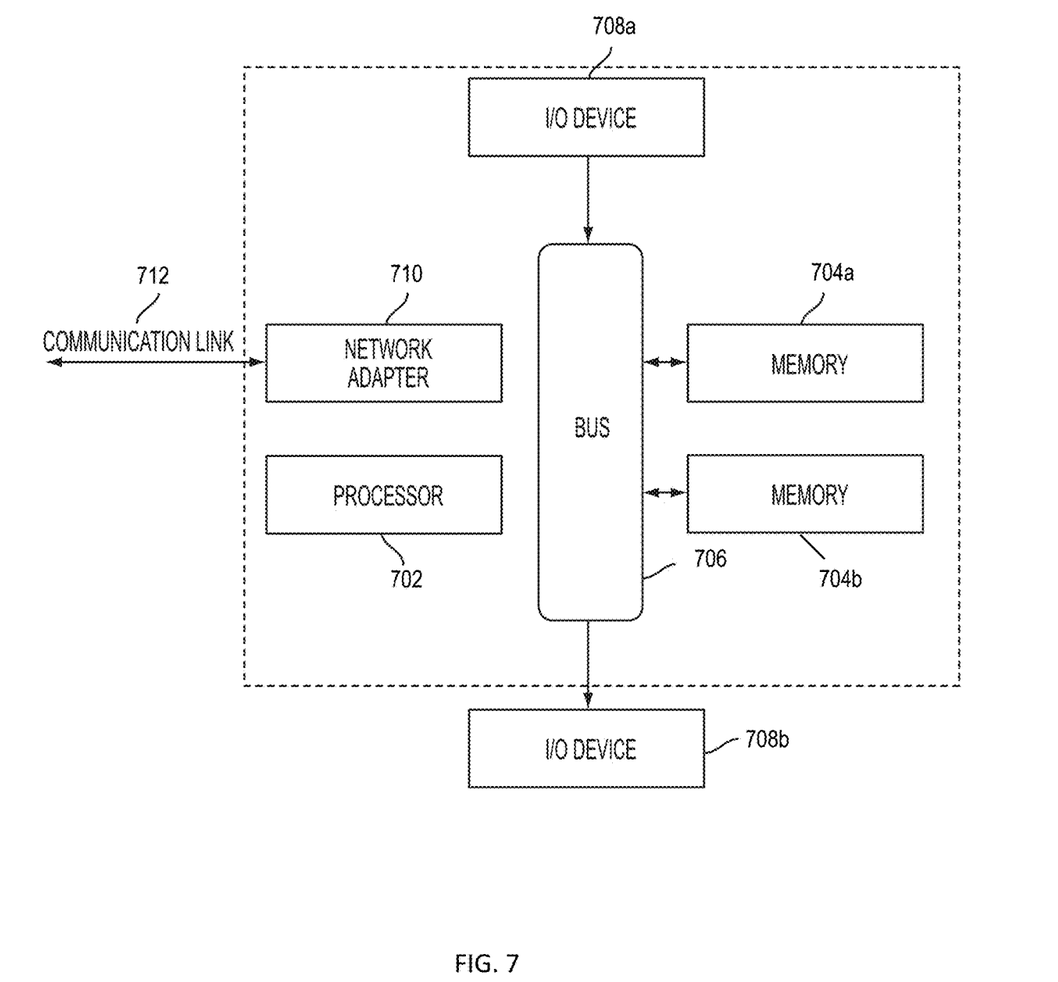
FIG. 7 illustrates a data processing system 700 suitable for storing the computer program product and/or executing program code relating to the choices of the users in accordance with an embodiment of the present invention.

FIG. 7 illustrates a data processing system 700 suitable for storing the computer program product and/or executing program code in accordance with an embodiment of the present invention. The data processing system 700 includes a processor 702 coupled to memory elements 704*a-b* through a system bus 706. In other embodiments, the data processing system 700 may include more than one processor and each processor may be coupled directly or indirectly to one or more memory elements through a system bus.

Memory elements 704*a-b* can include local memory employed during actual execution of the program code, bulk storage, and cache memories that provide temporary storage of at least some program code in order to reduce the number of times the code must be retrieved from bulk storage during execution. As shown, input/output or I/O devices 708*a-b* (including, but not limited to, keyboards, displays, pointing devices, etc.) are coupled to the data processing system 700. I/O devices 708*a-b* may be coupled to the data processing system 700 directly or indirectly through intervening I/O controllers (not shown).

In FIG. 7, a network adapter 710 is coupled to the data processing system 702 to enable data processing system 702 to become coupled to other data processing systems or remote printers or storage devices through communication link 712. Communication link 712 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a cellular network used for machine-to-machine (M2M) communications but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method comprising:
    generating a non-recurring secure identifier by a service provider for a batch of products, intended to provide network connection, grouped together as a package for sale;
    assigning the non-recurring secure identifier to the batch of products by the service provider, wherein the batch of products includes a plurality of products, wherein each product has a product identifier, and wherein the product identifiers comprises any of: Integrated Circuit Card Identifier (ICCID), International Mobile Subscriber Identity (IMSI), other identifier used to identify a device on a wireless network, a serial number or a combination thereof;
    using the non-recurring secure identifier by a recipient of the batch of products for registering the batch of products received;
    associating the plurality of products included in the batch of products with an account of the recipient based on the non-recurring secure identifier; and
    enabling each product included in the batch of products by the service provider to receive network services associated with the account of the recipient.

2. The computer-implemented method of claim 1, wherein the non-recurring secure identifier comprises at least two digits, wherein at least one of the at least two digits is an alpha numeric and other digit of the at least two digits is generated by using an algorithm for secure validation.

3. The computer-implemented method of claim 2, wherein the at least one of the at least two digits is generated using a method for generating series of numbers.

4. The computer-implemented method of claim 1, wherein the batch of products contains one or more products, wherein each of the one or more products is identified by at least one other distinct number.

5. The computer-implemented method of claim 4, wherein the non-recurring secure identifier is used for correlating each of the one or more products to the product identifier, wherein the product identifier comprises at least one other distinct number of that product and associating the one or more products with the account of the recipient.

6. The computer-implemented method of claim 4, wherein the one or more products intended to provide network connection comprises a device that is intended to connect or enable other devices to connect to a wireless network.

7. The computer-implemented method of claim 4, wherein the at least one other distinct number comprises any of an Integrated Circuit Card Identifier (ICCID), International Mobile Subscriber Identity (IMSI), other identifier used to identify a device on a wireless network, a serial number or a combination thereof.

8. The computer-implemented method of claim 2, wherein the algorithm for secure validation comprises any of a Luhn algorithm, Verhoeff algorithm, Damm algorithm.

9. The computer-implemented method of claim 1, wherein the non-recurring secure identifier comprises at least six digits, wherein at least five of the at least six digits are alpha numeric and the sixth digit is generated by using an algorithm for secure validation.

10. The computer-implemented method of claim 9, wherein the at least five of the at least six digits is generated using a method for generating series of numbers.

11. The computer-implemented method of claim 1, further comprising providing security measures by using validation parameters comprising any of number of digits in a package code, a user identification (UserID), presence of the package code in the system, maximum package size allowed, presence of a pending order against the account and product type associated with the pending order, number of packages in the pending order that are not already activated, package size selected for provisioning relative to package size in the order and any combination thereof.

12. A computer-implemented system for tracking physical delivery and subsequent registration of a batch of products comprising:
    a processor, and
    a memory in communication with the processor wherein the memory containing program instructions which when executed by the processor, perform the following operations comprising:
        generating a non-recurring secure identifier by a service provider for a batch of products, intended to provide network connection, grouped together as a package for sale;
        assigning the non-recurring secure identifier to the batch of products by the service provider, wherein a plurality of products, wherein each product has a product identifier, and wherein the product identifiers comprises any of: Integrated Circuit Card Identifier (ICCID), International Mobile Subscriber Identity (IMSI), other identifier used to identify a device on a wireless network, a serial number or a combination thereof; and
        using the non-recurring secure identifier by a recipient of the batch of products for registering the batch of products received;
        associating the plurality of products included in the batch of products with an account of the recipient based on the non-recurring secure identifier; and
        enabling each product included in the batch of products by the service provider to receive services associated with the account of the recipient.

13. The computer-implemented system of claim 12, wherein the non-recurring secure identifier comprises at least two digits, wherein at least one of the at least two digits is alpha numeric and other digit of the at least two digits is generated by using an algorithm for secure validation.

14. The computer-implemented system of claim 13, wherein the at least one of the at least two digits is generated using a method for generating series of numbers.

15. The computer-implemented system of claim 12, wherein the batch of products contains one or more products, wherein each of the one or more products is identified by at least one other distinct number.

16. The computer-implemented system of claim 15, wherein the non-recurring secure identifier is used for correlating each of the one or more products to the product identifier, wherein the product identifier comprises at least one other distinct number of that product and associating the one or more products with the account of the recipient.

17. The computer-implemented system of claim 16, wherein the one or more products intended to provide network connection comprises a device that is intended to connect or enable other devices to connect to a wireless network.

18. The computer-implemented system of claim 16, wherein the at least one other distinct number comprises any of an Integrated Circuit Card Identifier (ICCID), International Mobile Subscriber Identity (IMSI), other identifier used to identify a device on a wireless network, a serial number or any combination thereof.

19. The computer-implemented system of claim 13, wherein the algorithm for secure validation comprises any of a Luhn algorithm, Verhoeff algorithm, Damm algorithm.

20. The computer-implemented system of claim 12, wherein the non-recurring secure identifier comprises at least six digits, wherein at least five of the at least six digits are alpha numeric and the sixth digit is generated by using an algorithm for secure validation.

21. The computer-implemented method of claim 20, wherein the at least five of the at least six digits is generated using a method for generating series of numbers.

22. The computer-implemented system of claim 14, further comprising providing security measures by using validation parameters comprising any of number of digits in a package code, a user identification (UserID), presence of the package code in the system, maximum package size allowed, presence of a pending order against the account and product type associated with the pending order, number of packages in the pending order that are not already activated, package size selected for provisioning relative to package size in the order and a combination thereof.

23. A computer program product stored on a non-transitory computer readable medium for tracking physical delivery and subsequent registration of a batch of products, comprising computer readable programming for causing a computer to control execution of an application for tracking physical delivery and subsequent registration of a batch of products comprising:
  generating a non-recurring secure identifier by a service provider for a batch of products, intended to provide network connection, grouped together as a package for sale;
  assigning the non-recurring secure identifier by the service provider to the batch of products, wherein the batch of products includes a plurality of products, wherein each product has a product identifier, and wherein the product identifiers comprise any of: Integrated Circuit Card Identifier (ICCID), International Mobile Subscriber Identity (IMSI), other identifier used to identify a device on a wireless network, a serial number or a combination thereof;
  using the non-recurring secure identifier by a recipient of the batch of products for registering the batch of products received;
  associating the plurality of products included in the batch of products with an account of the recipient based on the non-recurring secure identifier; and
  enabling each product included in the batch of products by the service provider to receive services associated with the account of the recipient.

24. The computer program product of claim 23, wherein the non-recurring secure identifier comprises at least two digits, wherein at least one of the at least two digits is an alpha numeric and other digit of the at least two digits is generated by using an algorithm for secure validation.

25. The computer program product of claim 24, wherein the at least one of the at least two digits is generated using a method for generating series of numbers.

26. The computer program product of claim 23, wherein the batch of products contains one or more products, wherein each of the one or more products is identified by at least one other distinct number.

27. The computer program product of claim 26, wherein the non-recurring secure identifier is used for correlating each of the one or more products to the product identifier, wherein the product identifier comprises at least one other distinct number of that product and associating the one or more products with the account of the recipient.

28. The computer program product of claim 26, wherein the one or more products intended to provide network connection comprises a device that is intended to connect or enable other devices to connect to a wireless network.

29. The computer program product of claim 26, wherein the at least one other distinct number comprises any of an Integrated Circuit Card Identifier (ICCID), International Mobile Subscriber Identity (IMSI), other identifier used to identify a device on a wireless network, a serial number or a combination thereof.

30. The computer program product of claim 29, wherein the algorithm for secure validation comprises any of a Luhn algorithm Verhoeff algorithm, Damm algorithm.

31. The computer program product of claim 23, wherein the non-recurring secure identifier comprises at least six digits, wherein at least five of the at least six digits are alpha numeric and the sixth digit is generated by using an algorithm for secure validation.

32. The computer program product of claim 31, wherein the at least five of the at least six digits is generated using a method for generating series of numbers.

33. The computer program product of claim 23, further comprising providing security measures by using validation parameters comprising any of number of digits in a package code, a user identification (UserID), presence of the package code in the system, maximum package size allowed, presence of a pending order against the account and product type associated with the pending order, number of packages in the pending order that are not already activated, package size selected for provisioning relative to package size in the order and a combination thereof.

\* \* \* \* \*